US010222253B2

(12) United States Patent
Dawson et al.

(10) Patent No.: US 10,222,253 B2
(45) Date of Patent: Mar. 5, 2019

(54) UV LASER BASED STAND-OFF ACOUSTIC SENSOR

(71) Applicant: LAWRENCE LIVERMORE NATIONAL SECURITY, LLC, Livermore, CA (US)

(72) Inventors: Jay W. Dawson, Livermore, CA (US); Graham S. Allen, Pleasanton, CA (US); Michael R. Carter, Livermore, CA (US); John E. Heebner, San Ramon, CA (US); Michael J. Messerly, Danville, CA (US); Paul H. Pax, Livermore, CA (US); Alexander M. Rubenchik, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 346 days.

(21) Appl. No.: 15/175,423

(22) Filed: Jun. 7, 2016

(65) Prior Publication Data

US 2018/0045544 A1    Feb. 15, 2018

Related U.S. Application Data

(60) Provisional application No. 62/192,191, filed on Jul. 14, 2015.

(51) Int. Cl.
*G01D 5/58* (2006.01)
*G01H 9/00* (2006.01)

(52) U.S. Cl.
CPC .................................. *G01H 9/00* (2013.01)

(58) Field of Classification Search
CPC ........................................................ G01H 9/00
See application file for complete search history.

(56) References Cited

U.S. PATENT DOCUMENTS

| 3,482,436 A | * | 12/1969 | Neish | G01H 9/00 |
| | | | | 73/657 |
| 6,034,760 A | * | 3/2000 | Rees | G01N 21/455 |
| | | | | 367/149 |
| 6,731,570 B1 | | 5/2004 | Langdon | |
| 7,190,635 B1 | * | 3/2007 | Killinger | G01S 5/20 |
| | | | | 367/128 |
| 7,283,426 B2 | * | 10/2007 | Grasso | G01S 17/026 |
| | | | | 367/149 |
| 8,203,911 B2 | * | 6/2012 | Kremeyer | G01N 21/1702 |
| | | | | 367/149 |
| 8,228,760 B2 | | 7/2012 | Jones et al. | |

(Continued)

*Primary Examiner* — Daniel Pihulic
(74) *Attorney, Agent, or Firm* — Eddie E. Scott

(57) ABSTRACT

A system for aerially surveying an area where a plane may have crashed in water and locating pings from the plane's black box using a laser on an aerial platform that produces laser pulses; using a launch telescope to direct the laser pulses to the water producing scattering from the laser pulses and a continuous stream of backscatter; using a receiving telescope to collect the continuous stream of backscatter; using an interferometer operatively connected to the receiving telescope to produce two outputs, wherein one output is the continuous stream of backscatter, and wherein the other output is a delayed replica of the first output; and using a data collection and analysis unit operatively connected to the interferometer to produce a measurement of the sound.

24 Claims, 6 Drawing Sheets

(56) References Cited

U.S. PATENT DOCUMENTS

| | | | |
|---|---|---|---|
| 8,599,649 B1 | 12/2013 | Antonelli et al. | |
| 8,675,451 B2 * | 3/2014 | Kremeyer | G01N 21/1702 367/149 |
| 2018/0045544 A1 * | 2/2018 | Dawson | G01H 9/00 |

* cited by examiner

UV LASER BASED STAND-OFF ACOUSTIC SENSOR

CROSS-REFERENCE TO RELATED APPLICATIONS

This application claims priority to and benefit under 35 U.S.C. § 119(e) of U.S. Provisional Patent Application No. 62/192,191 filed Jul. 14, 2015 entitled "UV laser based stand-off acoustic sensor," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to sensors and more particularly to a UV laser based stand-off acoustic sensor.

State of Technology

This section provides background information related to the present disclosure which is not necessarily prior art.

U.S. Pat. No. 6,731,570 for sound detection provides the state of technology information in the portions of the patent that are reproduced below.

"This invention relates to improvements in or relating to sound detection, in particular to a remote sound detector and a method of remote sound detection. Acoustic signals are frequently used for detecting and locating remote objects such as guns and vehicles on a battlefield. Sensitive directional acoustic receivers are able to determine the direction of acoustic signals emanating from powerful remote sources with considerable accuracy. This enables the determination of the position of the source from which the acoustic signal is emanating, provided that there are no intervening obstacles to attenuate or diffract the acoustic signal. There are several known laser techniques used for measuring the velocity of air or airflow from a remote position, for example the measurement of air velocity and airflow profile in a wind tunnel using a laser beam passed into the airflow through a window. A typical technique employs a laser to produce two beams intersecting at an angle at a point within the airflow, producing interference fringes in the region where the beams overlap. Thus particles propelled by the airflow through the fringes produce scattered light which is modulated periodically by the passage of the particles through the fringes. The frequency of modulation, detected by an optical receiver, provides a measurement of the particle velocity and hence the airflow velocity. This technique is difficult to employ effectively at a range of more than a few meters from the laser source. Therefore a different technique is required to make measurements at longer ranges."

U.S. Pat. No. 8,599,649 for a laser-based method of detecting underwater sound through an ice layer provides the state of technology information in the portions of the patent that are reproduced below.

"The purpose of the invention is to detect underwater acoustic sound impinging on an ice object that is partially submerged in water by using a laser Doppler vibrometer sensor to measure the surface velocity and therefore an acoustic pressure signal at the ice surface being probed. As noted, a surface with a poor reflective quality due to angled or snow-covered ice surfaces and motion of the ice will degrade sensor performance by increasing the signal dropout rate. A solution is to monitor the ice surface using an illuminating source and record the reflected light using a camera to identify the trajectory to areas of direct reflection back to the laser source and to actively steer the sensing laser along that trajectory onto a glint retro-reflection surface using a glint tracking device. The result is that the laser is steered onto a position where the LDV will receive a direct reflection from the ice surface."

U.S. Pat. No. 8,228,760 for an airborne laser-acoustic mine detection system provides the state of technology information in the portions of the patent that are reproduced below.

"The present invention includes a system and method for using acoustical pulses generated from an airborne laser source to identify and locate targets under water. An array of acoustic sensors, such as passive sonobuoys at the ocean surface, is deployed by aircraft so that three or more acoustic sensors are within a predefined range from objects to be detected. The position of the acoustic sensors is known at the time of deployment or can be determined after deployment, for example by including a global positioning system (GPS) receiver in each sensor or by determining acoustic travel times from multiple known laser-acoustic source locations to each sensor. Each area surrounded by three or more acoustic sensors comprises a search cell, within which sonar scattering data can be used to locate objects. The maximum size of the search cells can be determined by parameters such as the acoustic source power spectrum, a target object's acoustic reflectivity, and the corresponding acoustic attenuation distance."

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods uses a transform limited short pulse (nanoseconds) UV laser to measure sound at long distances. This can be accomplished covertly as UV pulses shorter than visible may be employed. The apparatus, systems, and methods collect the Rayleigh back scatter from the UV light in a telescope, delays part of the return with respect to itself and interferes the delayed return with the immediate return. The comparison of amplitudes of return from a series of pulses as a function of delay relative to launch of the pulse provides a means by which the probed medium (air or water) may be interrogated for optical phase changes due to pressure and motion induced by sound waves. The apparatus, systems, and methods are self-referencing and thus independent of common path phase changes. In cases where there is a dramatic change in Rayleigh scattering such as at an air-water interface the uptick provides a point of reference that creates an insensitivity to motion of the sensor system.

The measurement of sound in an environment at long distances involves the steps of directing a laser from a platform wherein the laser produces laser pulses; using a launch telescope to direct the laser pulses to the environment producing scattering from the laser pulses and a continuous stream of backscatter; using a receiving telescope to collect the continuous stream of backscatter; using an interferometer operatively connected to the receiving telescope to produce two outputs, wherein one output is the continuous stream of backscatter, and wherein the other output is a delayed replica of the first output; and using a data collection and analysis unit operatively connected to the interferometer to produce a measurement of the sound.

In one embodiment the inventor's apparatus, systems, and methods include a platform; a laser operatively connected to the platform that produces laser pulses; a launch telescope operatively connected to the laser that directs the laser pulses to the environment producing scattering from the laser pulses and a continuous stream of backscatter; a receiving telescope operatively connected to the platform that collects the continuous stream of backscatter; an interferometer operatively connected to the receiving telescope that produces two outputs, wherein one output is the continuous stream of backscatter, and wherein the other output is a delayed replica of the first output; and a data collection and analysis unit operatively connected to the interferometer that produces a measurement of the sound.

The inventor's apparatus, systems, and methods can be used to remotely interrogate sound. For example, it can be used to aerially survey an area where a plane may have crashed and seek the pinging from the plane's black box. The apparatus, systems, and methods enable rapid searching over large areas of the ocean and information collected and evaluated with high confidence. The inventor's apparatus, systems, and methods can also be used to study of wildlife or the environment in a survey form from a moving aerial platform.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
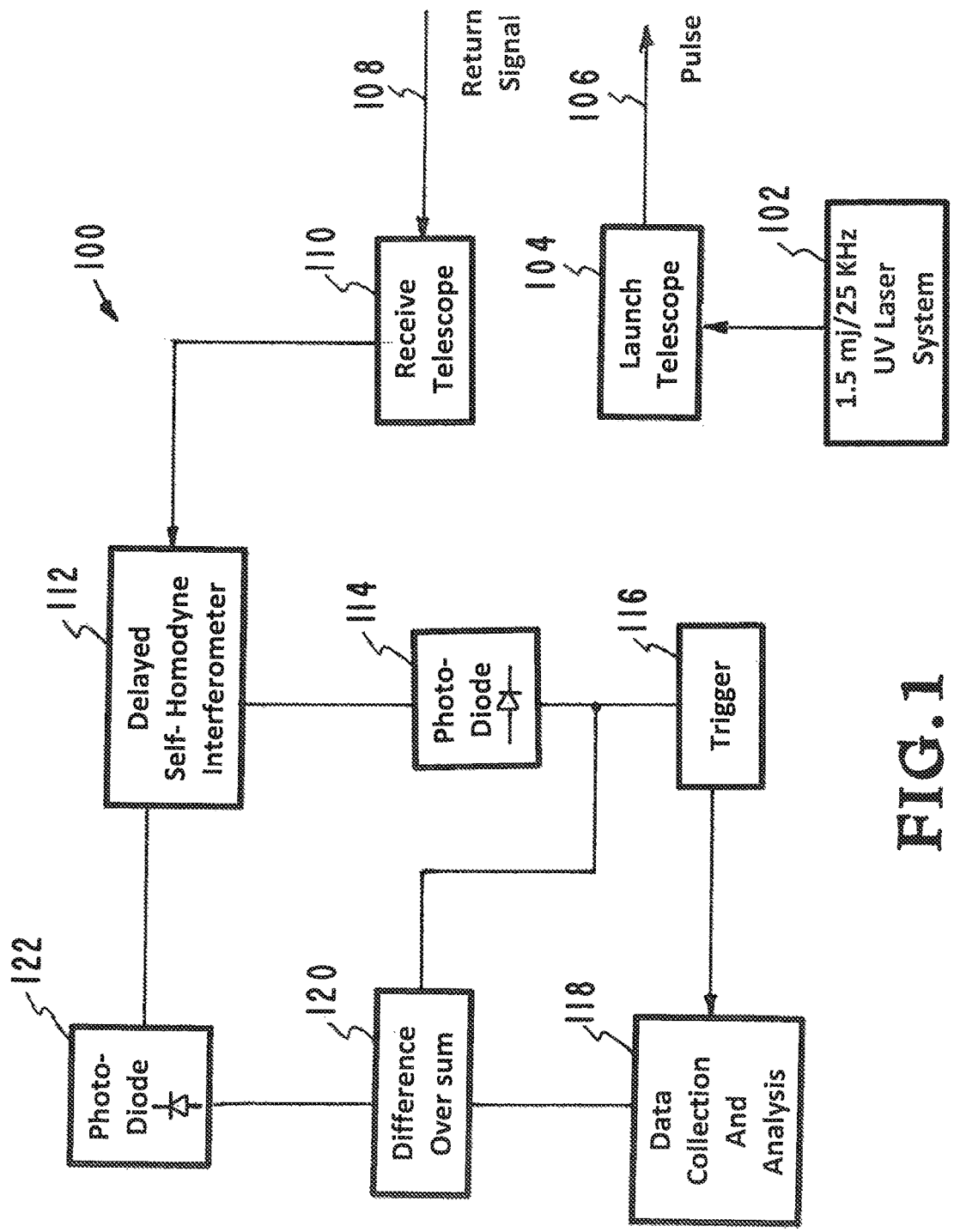
FIG. 1 illustrates one embodiment of the apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims. The inventor's apparatus, systems, and methods include but are not limited the different features and embodiments identified and described below.

The ability to remotely detect acoustic signals near the surface of a body of water from an aerial platform or other platform not in direct contact with the water surface.

A new self-referencing method for remote sensing of acoustic signals in water with a frequency range of 0.1-10 kHz and sound pressure levels of <80 dB re 1 µPa that is insensitive to the motion of the aerial platform. Note that this is near the level of the worst-case acoustic ambient noise in many sea states.

A system that combines the benefits of low-loss optical transmission in the air with low-loss acoustic transmission in the water. The acoustic to optical conversion occurs in the topmost layer (~1 m) of the water and thus does not require exceptional water clarity to function. In fact the proposed scheme will likely work with minimal degradation (or perhaps even be enhanced) in turbid or clouded water. (Mie vs Rayleigh scattering mechanisms)

The inventors also believe this embodiment may be modified to collect accurate information on aerosol concentrations over the surface of the sea. The shortage of information on aerosol concentrations, especially in windy environments is a problem for reliable modeling of laser propagation close to the water. Using short, nanosecond pulses the inventors can relate the scattering signal arrival time with the scattering height. On the specific height the distribution of aerosol has a power distribution over the size and is specified by the two parameters-the exponent of this distribution and total density of aerosol. The measurements with two wavelengths e.g. 3 w and 4 w which have a strong scattering signal will enable the calculation of these two parameters.

Also the inventors believe the use of UV light in the region of the solar spectrum that does not reach the earth's surface will enable remote detection of sound from air itself.

In one embodiment the inventor's apparatus, systems, and methods include a platform; a laser operatively connected to the platform that produces laser pulses; a launch telescope operatively connected to the laser that directs the laser pulses to the environment producing scattering from the laser pulses and a continuous stream of backscatter; a receiving telescope operatively connected to the platform that collects the continuous stream of backscatter; an interferometer operatively connected to the receiving telescope that produces two outputs, wherein one output is the continuous stream of backscatter, and wherein the other output is a delayed replica of the first output; and a data collection and analysis unit operatively connected to the interferometer that produces a measurement of the sound. The measurement of sound in an environment at long distances involves the steps of directing a laser from a platform wherein the laser produces laser pulses; using a launch telescope to direct the laser pulses to the environment producing scattering from the laser pulses and a continuous stream of backscatter; using a receiving telescope to collect the continuous stream of backscatter; using an interferometer operatively connected to the receiving telescope to produce two outputs, wherein one output is the continuous stream of backscatter, and wherein the other output is a delayed replica of the first output; and using a data collection and analysis unit operatively connected to the interferometer to produce a measurement of the sound.

The term "long distance" as used in this application means a distance in the range of one meter to ten kilometers.

An acoustic or pressure wave propagating through water creates a change in refractive index in the water, which in turn creates a fluctuating optical path length at the acoustic frequency proportional to the pressure of the acoustic signal. Near the surface, there is also a physical height change of the water column and induced change of the hydrostatic pressure, pgh. This effect also creates an optical path length change that is proportional to the pressure of the acoustic signal and fluctuating at the acoustic frequency. The combination of these effects creates an optical path sound pressure level.

Figure 2:
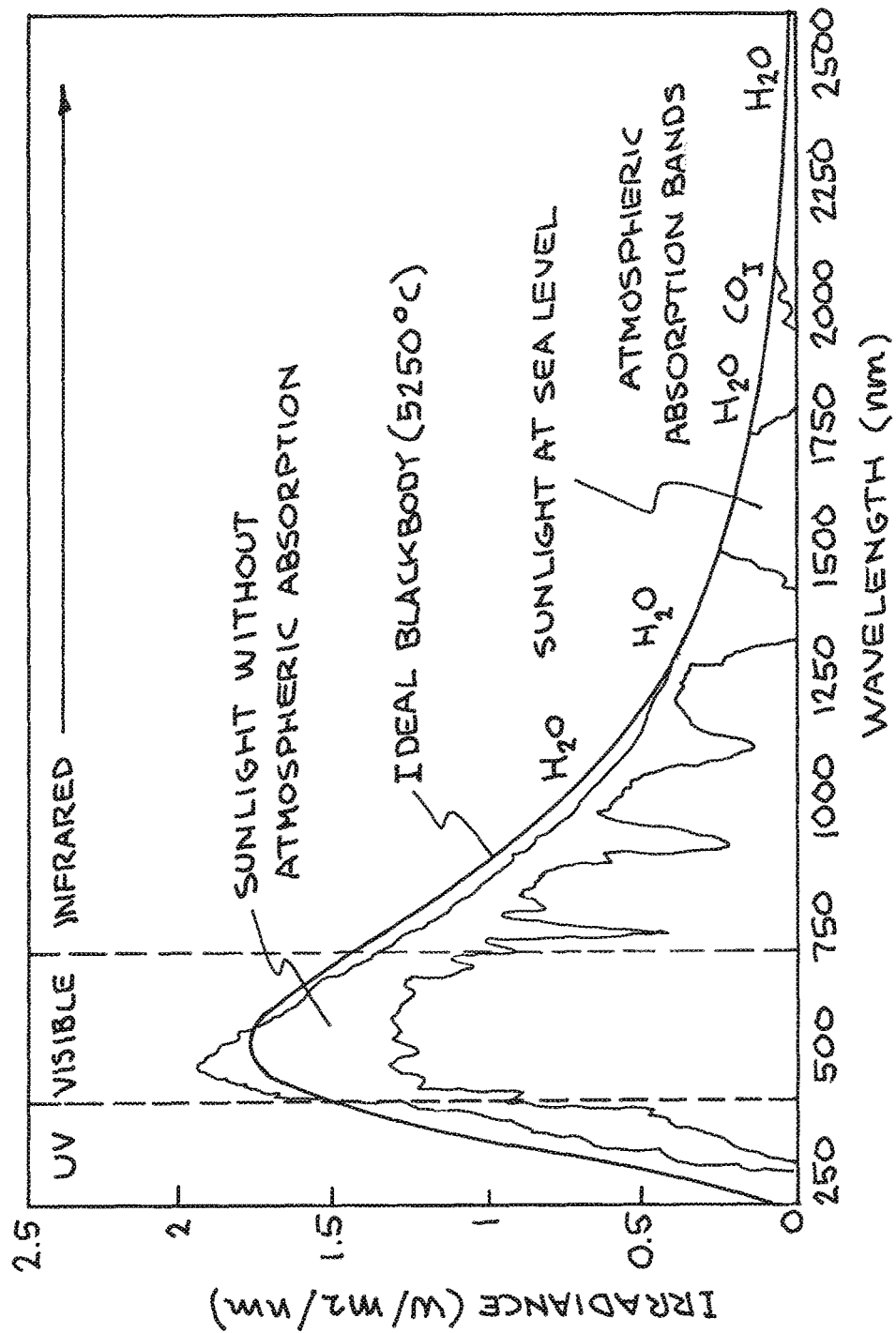
FIG. 2 is a graph showing the solar radiation spectrum.

Optical path length changes may be detected with very high resolution via interferometry. FIG. 1 is a simplified block diagram of a system 100 using interferometry to sense the acoustically induced optical path length changes in the water column just below the air-water interface. The components of the system 100 illustrated in FIG. 1 include UV laser system 102, launch telescope 104, pulse 106, return signal 108, receive telescope 110, delayed self-homodyne interferometer 112, photo-diode 114, trigger 116, data collection and analysis 118, difference over sum 121, and photo-diode 122. FIG. 2 is a graph showing the solar radiation spectrum.

Referring again to FIG. 1, a high energy, transform limited, nanosecond UV laser pulse 106 is launched from an aerial platform towards the water via the launch telescope (5 cm diameter) 104. Rayleigh scattering from the UV light creates a continuous stream of coherent backscatter that is collected by the receive telescope (30 cm diameter) 110 and launched into the delayed self-homodyne interferometer 112. This interferometer interferes the continuously scattered light from the pulse with a delayed replica of itself. The two outputs of the interferometer measure intensities that are determined by the phase (or optical path length) difference between a location $x(t)$ and a second location $x(t+\Delta t)=x(t)+\Delta x$, where $\Delta x$ is determined by the path delay of the longer of the two arms of the interferometer. The result is a differential as opposed to absolute phase signal, and is therefore insensitive to variation in the common path.

Computing the difference of the intensity of the two photo-diodes divided by the sum of the intensities of the two photodiodes generates a signal that is to first order independent of the received intensity and proportional only to the optical path length (or phase) of the light scattered from the two locations. The amplitude of this trace as a function of time provides a snapshot of the optical path length of the water column as a function of depth. Capturing and comparing a series of these traces as a function of time enables the acoustic signal in the water to be reconstructed up to a frequency of ½ the pulse repetition rate with a sensitivity of $1/1,000\times$ or better of the optical wavelength employed for detection. At high repetition rate, slowly varying effects such as thermal, currents and wave-motion will appear to be frozen in time and only rapidly varying effects such as acoustic pressure waves will be detected.

Note that when the pulse strikes the air-water interface the received Rayleigh backscattered light increases by a factor of ~100× due to the increased scattering from the denser medium. The corresponding spike in the received signal may be employed as a trigger to alert the detection system to capture a trace from the interferometer. The combination of this clear marker of the air-water interface and the fact that the interferometer's output signal depends only on the optical path length (or phase) difference accumulated by the pulse between $x(t)$ and $x(t+\Delta t)$ makes the detection system insensitive to the motion of the aerial platform. The inventors further note at this point that as we rely upon Rayleigh scattered light to provide the signal, clear water is the worst case. Turbid or cloudy water will increase the Rayleigh scattered signal from the near surface. It will of course more rapidly attenuate the light traveling through the water and thus preclude measurement of the water column significantly below the surface, but near the surface, it enhances the return. Another way of phrasing this last statement is that the case we analyze in detail below is based upon Rayliegh scattering, which is the weakest of all the scattering mechanisms. In the case of aerosols or cloudy or turbulent water, Mie scattering will dominate and provide backscattered signal strengths significantly stronger than the Rayleigh scattering strength.

The inventors operate the system with UV light as UV light that provides three clear advantages over other wavelengths. First, the ozone layer of the atmosphere absorbs all the sunlight below about 280 nm, thus this region of the spectrum is "dark" regardless of the time of day. This means our system will never be blinded by background light, enhancing the system sensitivity. Note the propagation of UV light in the lower atmosphere (below the ozone layer) is still quite good down to ~200 nm. Second, the volumetric Rayleigh scattering coefficient as a function of wavelength is proportional to $1/\Delta 4$ and thus the detected signal in the UV is 256× bigger than a corresponding IR pulse greatly reducing the required laser power. Third, the sensitivity of an interferometer to an optical path length change is directly proportional to the wavelength of the light interrogating the medium. Thus the UV is 4× more sensitive than the IR.

The inventors previously developed and demonstrated a fiber laser pulsed source 3 mJ, transform limited temporally square, sub-ns pulses with excellent timing and a diffraction limited beam were generated at 25 kHz and 1040 nm by this system. Given the 3 MW peak powers it would be relatively straightforward to frequency quadruple the output of this laser to 260 nm with at least 50% conversion efficiency providing an efficient, 25 kHz, 1.5 MW peak power source that may be compactly and robustly packaged for a flight environment. This laser would have an average power of <40 W and consume <400 W of electrical power. Note that the previous program data suggests this laser system will scale to much higher pulse energies and average powers enabling standoff distances greater than the 1500 ft proposed here. However, for the purposes of the point design discussed here, higher powers are not required.

Figure 3:
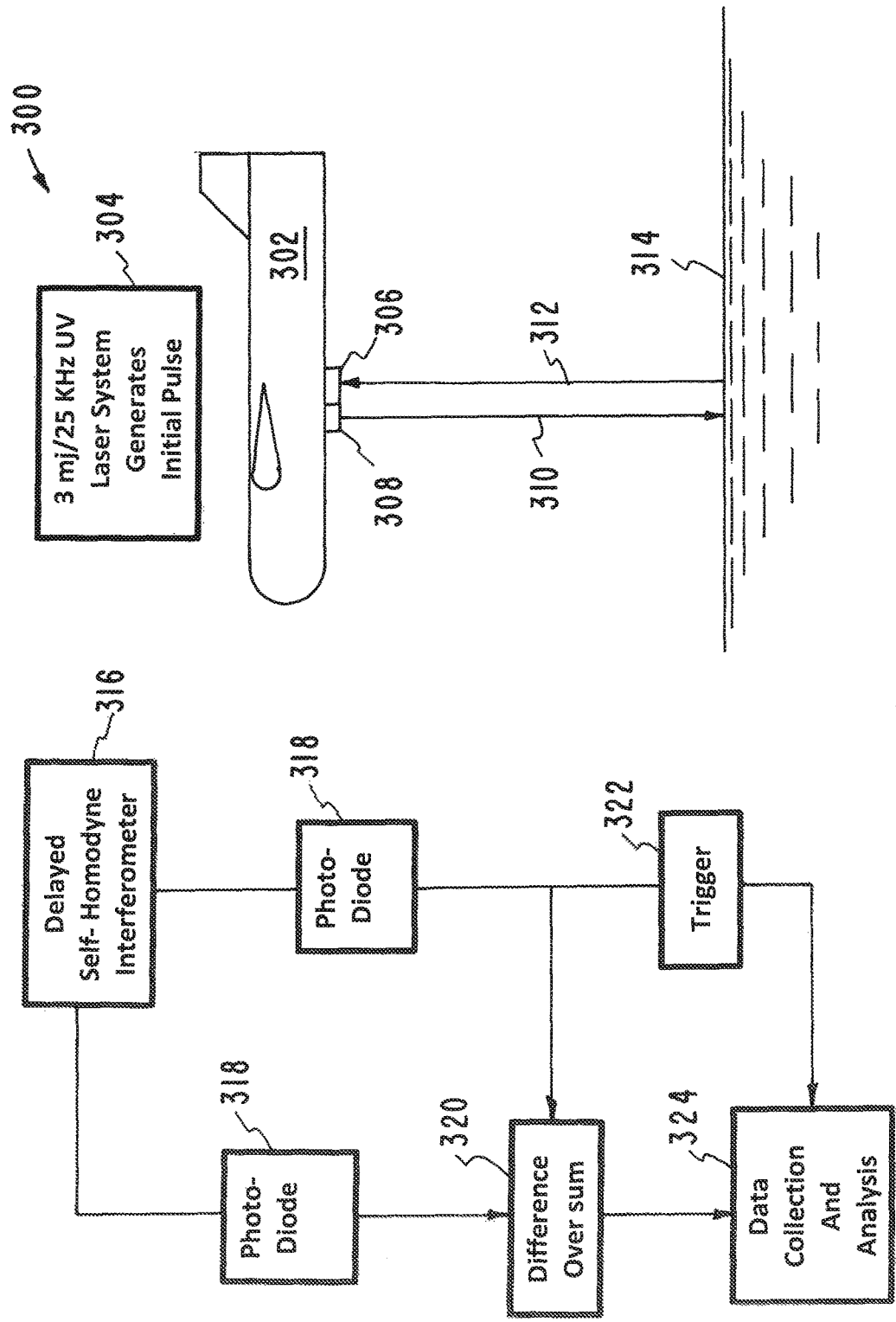
FIG. 3 illustrates another embodiment of the apparatus, systems, and methods.

Referring now to FIG. 3, another embodiment of the inventor's apparatus, systems, and methods is illustrated. This embodiment is designated generally by the reference numeral 300. The components of the system 300 illustrated in FIG. 3 include system transport (manned or un-manned) 302, laser system 304, telescope 306, telescope 308, initial pulse 310, return pulse 312, ocean surface 314, delayed self-homodyne interferometer 316, photodiodes 318, difference over sum 320, and data collection and analysis 322.

As shown in FIG. 3, a high energy, transform limited, nanosecond UV laser pulse 310 is launched from the aerial platform 302 towards the water 314 via the launch telescope (5 cm diameter) 308. Rayleigh scattering from the UV light creates a continuous stream of coherent backscatter that is collected by the receive telescope (30 cm diameter) 306 and launched into the delayed self-homodyne interferometer 316. This interferometer interferes the continuously scattered light from the pulse with a delayed replica of itself. The two outputs of the interferometer measure intensities that are determined by the phase (or optical path length) difference between a location x(t) and a second location x(t+Δt)=x(t)+Δx, where Δx is determined by the path delay of the longer of the two arms of the interferometer. The result is a differential as opposed to absolute phase signal, and is therefore insensitive to variation in the common path.

Computing the difference of the intensity of the two photo-diodes 318 divided by the sum of the intensities of the two photodiodes generates a signal that is to first order independent of the received intensity and proportional only to the optical path length (or phase) of the light scattered from the two locations. The amplitude of this trace as a function of time provides a snapshot of the optical path length of the water column as a function of depth. Capturing and comparing a series of these traces as a function of time enables the acoustic signal in the water to be reconstructed up to a frequency of ½ the pulse repetition rate with a sensitivity of 1/1,000× or better of the optical wavelength employed for detection. At high repetition rate, slowly varying effects such as thermal, currents and wave-motion will appear to be frozen in time and only rapidly varying effects such as acoustic pressure waves will be detected.

Figure 4:
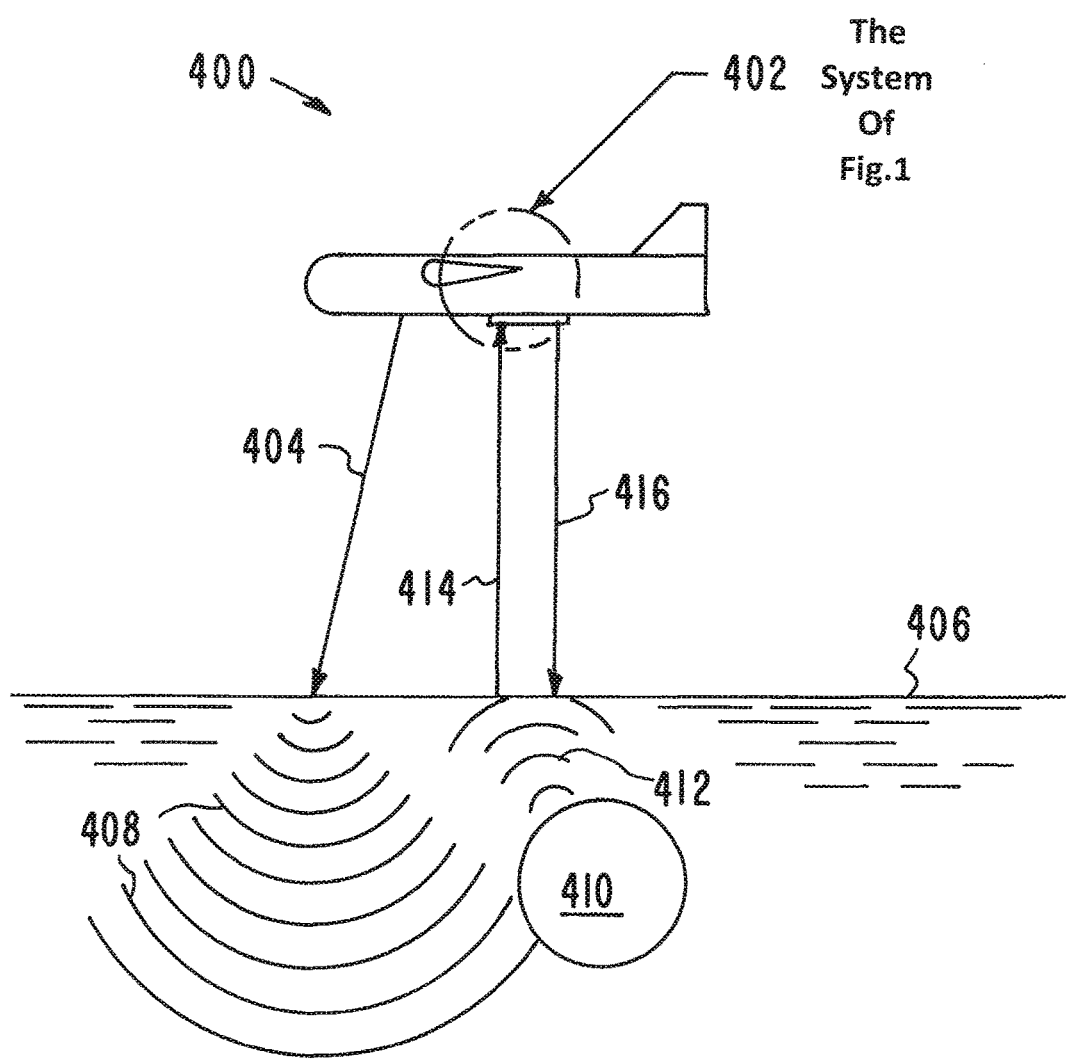
FIG. 4 illustrates yet another embodiment of the apparatus, systems, and methods.

Referring now to FIG. 4, yet another embodiment of the inventor's apparatus, systems, and methods is illustrated. This embodiment is designated generally by the reference numeral 400. The components of the system 400 illustrated in FIG. 4 include the FIG. 1 system 402, laser signal generator 404, sea surface 406, sound waves 408, submerged object 410, sound waves 412, return signal 414, and initial pulse 416. This embodiment includes all of the elements of the system shown in FIG. 1 plus a laser signal generator 404 for creating sound waves 408 in the water 406. A high energy, transform limited, nanosecond UV laser pulse 416 is launched from the aerial platform towards the water via the launch telescope (5 cm diameter). Simultaneously, a laser signal generator 404 creates sound waves in the water.

Rayleigh scattering from the UV light creates a continuous stream of coherent backscatter that is collected by the receive telescope (30 cm diameter) and launched into the delayed self-homodyne interferometer. This interferometer interferes the continuously scattered light from the pulse with a delayed replica of itself. The two outputs of the interferometer measure intensities that are determined by the phase (or optical path length) difference between a location x(t) and a second location x(t+Δt)=x(t)+Δx, where Δx is determined by the path delay of the longer of the two arms of the interferometer. The result is a differential as opposed to absolute phase signal, and is therefore insensitive to variation in the common path.

Computing the difference of the intensity of the two photo-diodes divided by the sum of the intensities of the two photodiodes generates a signal that is to first order independent of the received intensity and proportional only to the optical path length (or phase) of the light scattered from the two locations. The amplitude of this trace as a function of time provides a snapshot of the optical path length of the water column as a function of depth. Capturing and comparing a series of these traces as a function of time enables the acoustic signal in the water to be reconstructed up to a frequency of ½ the pulse repetition rate with a sensitivity of 1/1,000× or better of the optical wavelength employed for detection. At high repetition rate, slowly varying effects such as thermal, currents and wave-motion will appear to be frozen in time and only rapidly varying effects such as acoustic pressure waves will be detected.

Figure 5:
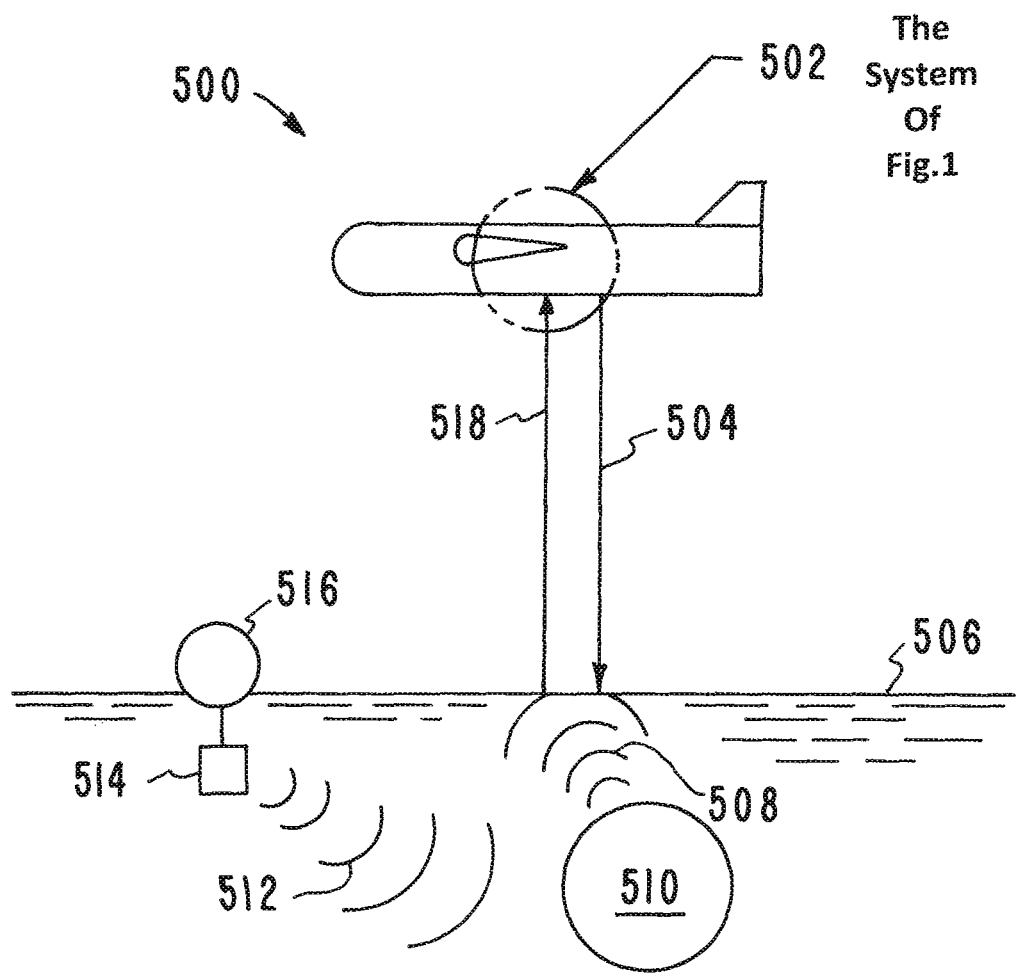
FIG. 5 illustrates another embodiment of the apparatus, systems, and methods.

Referring now to FIG. 5, another embodiment of the inventor's apparatus, systems, and methods is illustrated. This embodiment is designated generally by the reference numeral 500. The components of the system 500 illustrated in FIG. 5 include FIG. 1 system 502, initial pulse 504, sea surface 506, sound waves 508, submerged object 510, sound waves 512, receiver 514, deployable signal generator 516, and return signal 518.

This embodiment includes all of the elements of the system shown in FIG. 1 plus a deployable signal generator 516 for creating sound waves 512 in the water 506. A high energy, transform limited, nanosecond UV laser pulse 504 is launched from the aerial platform towards the water via the launch telescope (5 cm diameter). Simultaneously, a laser signal generator creates sound waves in the water.

Rayleigh scattering from the UV light creates a continuous stream of coherent backscatter that is collected by the receive telescope (30 cm diameter) and launched into the delayed self-homodyne interferometer. This interferometer interferes the continuously scattered light from the pulse with a delayed replica of itself. The two outputs of the interferometer measure intensities that are determined by the phase (or optical path length) difference between a location x(t) and a second location x(t+Δt)=x(t)+Δx, where Δx is determined by the path delay of the longer of the two arms of the interferometer. The result is a differential as opposed to absolute phase signal, and is therefore insensitive to variation in the common path.

Computing the difference of the intensity of the two photo-diodes divided by the sum of the intensities of the two photo-diodes generates a signal that is to first order independent of the received intensity and proportional only to the optical path length (or phase) of the light scattered from the two locations. The amplitude of this trace as a function of time provides a snapshot of the optical path length of the water column as a function of depth. Capturing and comparing a series of these traces as a function of time enables the acoustic signal in the water to be reconstructed up to a frequency of ½ the pulse repetition rate with a sensitivity of 1/1,000× or better of the optical wavelength employed for detection. At high repetition rate, slowly varying effects such as thermal, currents and wave-motion will appear to be frozen in time and only rapidly varying effects such as acoustic pressure waves will be detected.

Figure 6:
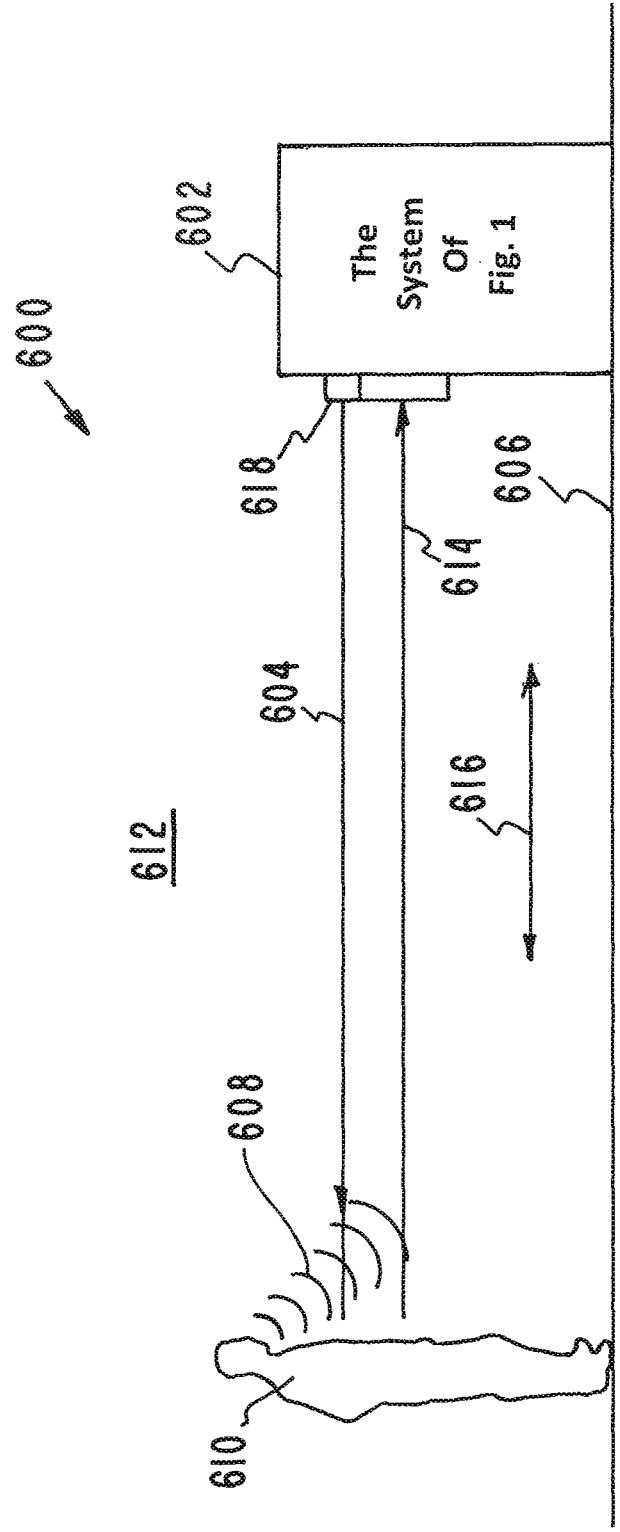
FIG. 6 illustrates another embodiment of the apparatus, systems, and methods.

Referring now to FIG. 6, another embodiment of the inventor's apparatus, systems, and methods is illustrated. This embodiment is designated generally by the reference numeral 600. The components of the system 600 illustrated in FIG. 6 include FIG. 1 system 602, initial pulse 604, ground 606, acoustic signal 608, individual 610, air medium 612, return signal 614, distance 616, and platform 618.

As shown in FIG. 6, the basic parts of the system illustrated in FIG. 1 are mounted on a stationary platform 618. The platform 618 is a stable platform that does not move during operation of the system 600. An individual that is talking is monitored by the system. A high energy, transform limited, nanosecond UV laser pulse is launched from the stationary platform toward the individual. Rayleigh scattering from the UV light creates a continuous stream of coherent backscatter that is collected by the receive telescope (30 cm diameter) and launched into the delayed self-homodyne interferometer. This interferometer interferes the continuously scattered light from the pulse with a delayed replica of itself. The two outputs of the interferometer measure intensities that are determined by the phase (or optical path length) difference between a location $x(t)$ and a second location $x(t+\Delta t)=x(t)+\Delta x$, where $\Delta x$ is determined by the path delay of the longer of the two arms of the interferometer. The result is a differential as opposed to absolute phase signal, and is therefore insensitive to variation in the common path.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for detecting sound in an environment at long distances, comprising:
   a platform;
   a laser operatively connected to said platform that produces laser pulses;
   a launch telescope operatively connected to said laser that directs said laser pulses to the environment producing scattering from said laser pulses and a continuous stream of backscatter;
   a receiving telescope operatively connected to said platform that collects said continuous stream of backscatter wherein said continuous stream of backscatter incudes a return pulse and delayed return pulse;
   an interferometer operatively connected to said receiving telescope the receives said return pulse and said delayed return pulse, interferes said delayed return pulse with said return pulse, and produces an output; and
   a data collection and analysis unit operatively connected to said interferometer that receives said output and provides a measurement of the sound in the environment.

2. The apparatus for detecting sound at long distances of claim 1 wherein said platform is an aerial platform.

3. The apparatus for detecting sound at long distances of claim 1 wherein said platform is a fixed platform.

4. The apparatus for detecting sound at long distances of claim 1 wherein said environment is water.

5. The apparatus for detecting sound at long distances, of claim 1 wherein said environment is an entity producing sound in air.

6. The apparatus for detecting sound at long distances of claim 1 wherein said environment is an individual producing sound in air.

7. The apparatus for detecting sound at long distances of claim 1 wherein said laser is a UV laser.

8. The apparatus for detecting sound at long distances of claim 1 wherein said laser is a UV laser that produces UV laser pulses.

9. The apparatus for detecting sound at long distances of claim 1 wherein said laser is a UV laser that produces nanosecond UV laser pulses.

10. The apparatus for detecting sound at long distances of claim 1 wherein said laser pulses produce Raleigh scattering.

11. The apparatus for detecting sound at long distances of claim 1 wherein said laser pulses produce coherent backscatter.

12. The apparatus for detecting sound at long distances of claim 1 wherein said interferometer is a delayed self-homodyne interferometer.

13. The apparatus for detecting sound at long distances of claim 1 further comprising a system for directing sound into the environment.

14. The apparatus for detecting sound at long distances of claim 1 further comprising a system for directing sound into a water environment.

15. The apparatus for detecting sound at long distances of claim 1 further comprising a laser system for directing sound into a water environment.

16. The apparatus for detecting sound at long distances of claim 1 further comprising a deployable sound generator system for directing sound into a water environment.

17. An apparatus for detecting sound in water at long distances, comprising:
  an aerial platform;
  a UV laser operatively connected to said areal platform that produces a nanosecond UV laser pulse;
  launch telescope operatively connected to said UV laser that directs said nanosecond UV laser pulse to said water producing Raleigh scattering from said nanosecond UV laser pulse and a continuous stream of coherent backscatter;
  a receiving telescope operatively connected to said areal platform that collects said continuous stream of coherent backscatter;
  a delayed self-homodyne interferometer operatively connected to said receiving telescope that produces two outputs, wherein one output is a portion of said continuous stream of coherent backscatter, and wherein the other output is a delayed portion of said continuous stream of coherent backscatter; and
  a data collection and analysis unit operatively connected to said delayed self-homodyne interferometer that produces an output of the detection of the sound in water.

18. A method of detecting sound in an environment at long distances, comprising the steps of:
  directing laser pulses from a platform into the environment producing scattering from said laser pulses and a continuous stream of backscatter;
  receiving said continuous stream of backscatter that includes a return pulse and delayed return pulse;
  interfering said delayed return pulse with said return pulse and producing an output; and
  analyzing said output for detecting the sound in the environment.

19. The method of detecting sound at long distances of claim 18 wherein said platform is an aerial platform.

20. The method of detecting sound at long distances of claim 18 wherein said platform is a fixed platform.

21. The method of detecting sound at long distances of claim 18 wherein said environment is water.

22. The method of detecting sound at long distances of claim 18 wherein said environment is an entity producing sound in air.

23. The method of detecting sound in water at long distances of claim 18 wherein said laser is a UV laser.

24. The method of detecting sound in water at long distances of claim 18 wherein said laser is a UV laser that produces UV laser pulses.

* * * * *